Feb. 24, 1942.   A. P. FERGUESON ET AL   2,274,134
FENDER AND FENDER SHIELD CONSTRUCTION
Filed Feb. 3, 1941   2 Sheets-Sheet 1
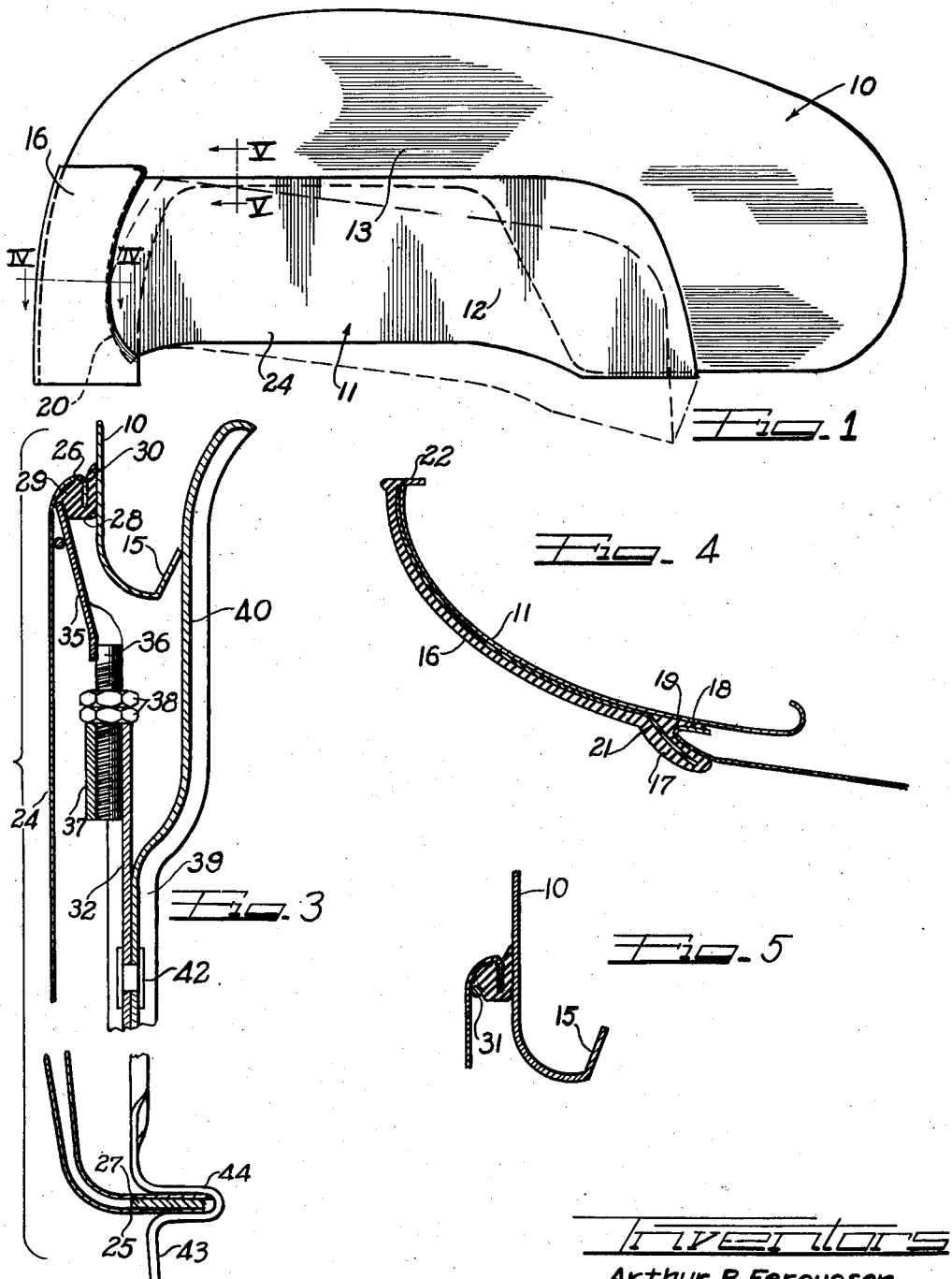
Inventors
Arthur P. Fergueson
George W. Schatzman

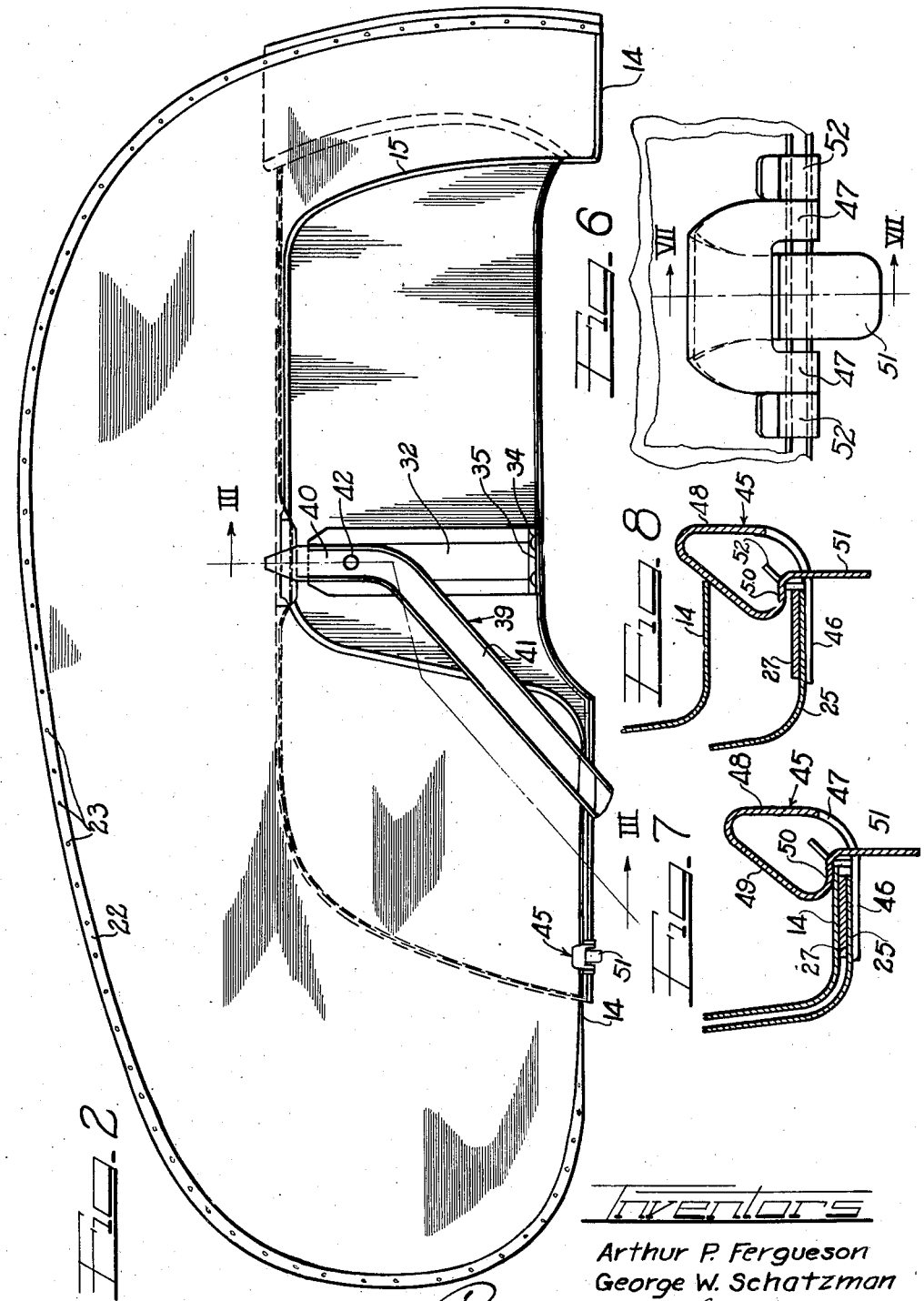

Patented Feb. 24, 1942

2,274,134

UNITED STATES PATENT OFFICE 2,274,134

FENDER AND FENDER SHIELD CONSTRUCTION

Arthur P. Fergueson and George W. Schatzman, Detroit, Mich., assignors to Houdaille-Hershey Corporation, Detroit, Mich., a corporation of Michigan Application February 3, 1941, Serial No. 377,174

6 Claims. (Cl. 280—153)

This invention relates to fender and fender shield construction and more particularly to a novel method and means of mounting and securing fender shields to a vehicle fender.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in an axial direction. Since this opening inherently presents an ugly outward appearance, detachable fender shields have been employed to substantially cover this opening.

As the term "fender shield" shall hereinafter be employed, it refers to any member which is adapted to be secured to a fender or other portion of a vehicle body for the purpose of covering the opening in the fender or vehicle body which is provided for access to a removal of the vehicle wheel. Furthermore, as the term "fender" shall hereinafter be employed, it refers to any form of wheel fender in its broad sense, whether such fender be separate from the vehicle body part, partly separate from the vehicle body part, or actually an integral part of the vehicle body, and whether or not it projects outwardly away from the principal body portion of the vehicle.

It is an object of the present invention to provide a novel combination fender and fender shield construction, and in which the fender shield is secured to the fender in a novel manner.

It is a further object of this invention to provide a fender shield and fender construction which is economical to manufacture, which is rugged and reliable in use, and in which the fender shield may be readily and quickly attached and detached from the vehicle fender.

Another object of the present invention is to provide a vehicle fender having a scuff pad on the forward or leading face thereof, which scuff pad has a lip portion spaced from the fender and behind which a fender shield is seated.

A still further object of the present invention is to provide a novel latch mechanism which may be cammed or snapped into tight latching engagement with the fender.

Another and further object of this invention is to provide a novel fender construction which is arranged to receive and have seated thereon a fender shield.

The novel features which we believe to be characteristic of our invention are set forth with particularity in the appended claims. Our invention itself, however, both as to its organization and manner of construction, together with further objects and advantages thereof, may best be understood by reference to the accompanying drawings, in which:

Figure 1 is a front elevational view of a vehicle fender and fender shield assembly;

Figure 2 is an enlarged rear elevational view of the fender and fender shield assembly shown in Figure 1;

Figure 3 is an irregular sectional view taken along the line III—III of Figure 2;

Figure 4 is a horizontal sectional view through the front portion of the fender and fender shield assembly as taken along the line IV—IV of Figure 1;

Figure 5 is a vertical sectional view as taken along the line V—V of Figure 1 showing the manner in which the top edge of the fender shield is seated on the fender;

Figure 6 is an enlarged rear view of the clamp at the lower rear corner of the fender shield;

Figure 7 is a vertical sectional view through the clamp as taken along the line VII—VII of Figure 6; and, Figure 8 is a sectional view similar to Figure 7 but showing the position of the clamp and the shield as the shield is being moved into latched engagement.

Referring now to the various figures of the drawings which illustrate one embodiment of the present invention, there is illustrated therein a vehicle fender 10 having a fender shield 11 mounted thereon over the wheel access opening 12 in the outer depending side wall 13 of the fender 10. While the fender 10 may assume a wide variety of shapes without departing from the spirit and scope of the present invention, and may, indeed, be formed integral and made a part of the body itself (not shown), the fender 10 has been illustrated as being of a high crown type. The fender shield 11 is detachably mounted on the vehicle fender 10 and is positioned to cover the relatively large opening 12 in the outer side wall 13 of the fender 10 which is conventionally provided in substantially all vehicle fenders to permit access to and removal of the vehicle wheel therethrough. The fender 10 is provided with bent back flange along its base edges as at 14 and around the opening 12 as at 15. These flange portions 14 and 15 of the fender 10 stiffen the fender in a manner well known to those skilled in the art.

The leading face of the fender 10 is equipped with a scuff pad 16 which is formed of rubber or some other equally suitable material. Scuff pads are frequently employed on the leading face of the rear fenders of automobiles of the present day. The scuff pad of the present invention, however, is of novel design for it not only serves to prevent marring of the fender due to flying stones and other foreign objects when the car is in motion, but it also serves as a mounting means for one end of the fender shield. More specifically, the scuff pad 16 has a rearwardly extending lip portion 17 which forms with the rear edge 18 of the scuff pad a channel-shaped recess 19 which is adapted to receive and have seated therein the leading edge 20 of the fender shield 11. The scuff pad 16 is preferably reinforced by a metal plate member 21 which extends across the rear face of the scuff pad throughout the major part of the body thereof but which is embedded in the outwardly flaring lip 17 (see Figure 4). The scuff pad 16 is secured to the fender 10 in any suitable manner.

As may be seen best in Figures 2 and 4 the outer marginal portion of the fender 11 is provided with an inturned flange 22 which is apertured as at 23 for attachment to the principal body portion of the vehicle (not shown).

The fender shield 11 comprises a panel portion 24, an inturned base edge 25 has a rolled edge 26 which extends across the top and down across the forward and rear edges of the fender shield. The lower edge 25 of the fender shield 11 is preferably reinforced by flat bar 27 which is bent to follow the varying shape of the lower edge of the fender shield 11. This bar 27 is riveted or otherwise suitably secured to the lower flange 25 of the fender shield 11.

In order to prevent a direct metal to metal contact where the fender shield is seated on the fender, a rubber edging or cushioning strip 28 is mounted on the rolled edge 26 of the fender shield. This rubber edging 28 has a base portion 29 which is seated in the channel formed by the rolled edge 26, and an outer lip portion 30 which is arranged to be seated against the fender 10. The edging or rubber cushioning strip 28 is preferably held in place by a wire 31 (see Figure 5) which bears against a suitable shoulder on the base portion 29 of the rubber edging 28. The wire 31 and the rubber edging 28 extend substantially around the entire top and side edges of the fender shield, the two lower ends of the wire 31 being secured to the fender shield in any suitable manner to force the wire up against the rubber edging 28. This particular type of mounting for a rubber edging is disclosed and claimed in the George W. Schatzman pending application entitled "Fender shield," Serial No. 269,651 filed April 24, 1939, and assigned to the same assignee as the present invention.

The fender shield 11 is further reinforced by a brace bar or strut 32 which extends upwardly behind the panel portion 24 from the lower edge 25 to a point in proximity to the top of the fender shield 11. This brace bar or strut 32 has a base portion 33 which is seated on the reinforcing bar 27 and which is riveted or bolted thereto as at 34. In order that the brace bar 32 may present sufficient rigidity without undue amount of metal being formed therein, it is preferably channel-shaped in cross section. Mounted on the top of the brace bar 32 is a vertically adjustable plate member 35 which extends up into and against the curled edge 26 of the fender shield 11. The novel features of this brace bar and the novel manner in which it may be secured to the fender shield are described in detail and claimed in the co-pending application of Herbert S. Jandus entitled "Fender shield and mounting means therefor," Serial No. 271,915, filed May 5, 1939, and assigned to the same assignee as the present invention. It is sufficient for purpose of the present application to point out that the vertically adjustable plate 35 is carried on a threaded stud 36 which extends down into a recess formed by the upper portion of the brace bar 32 and a strap bracket 37 which is secured to the brace bar 32. A pair of nuts 38 are threaded onto the threaded shank portion of the stud 36 and are tightened down against the top of the brace bar 32 to force the plate 35 upwardly into tight engagement with the upper edge of the fender shield.

Mounted on the brace bar or strut 32 is a latching arm 39 which includes a short leg portion 40 and a relatively long leg portion 41 disposed at an angle with respect to the short leg portion 40. This latching arm 39 may be conveniently mounted on the brace bar or strut 32 by a mounting stud or rivet 42 carried by the strut 32. The short leg portion 40 of the latching arm 39 is shaped to engage the rearwardly bent flange 15 of the fender 10 at the top of the opening 12. The long leg 41 of the latching arm 39 extends downwardly to the flange 25 and bar 27, and its lower end 42 is provided with a U-shaped bend 44 therein which extends around the lower edge 14 of the fender 10 and the base flange 25 of the fender shield 11.

The fender shield 11 is vertically supported on the fender 10 by the nested engagement of the leading edge 20 of the fender shield in the channel formation pocket 19 formed by the rear edge 18 and the lip 17 of the scuff pad 16. Due to the curvature of the lower portion of the lip 17 and the rear edge 18 of the scuff pad 16, as is clearly shown in Figure 1, the forward edge 20 of the fender shield 11 is in effect hooked into the channel formation and obtains both vertical support as well as lateral restraint.

The rear edge of the fender shield 11 is supported by a latching means 45 which may be seen best in Figures 6, 7 and 8 of the drawings. This latching mechanism or spring clip 45 has a base portion 36 which is welded or otherwise suitably secured to the under side of the base flange 25 of the fender shield 11. Rising upwardly from the base portion 46 of the clip 45 is a pair of inner legs 47 which merge into a bent tongue 48 which extends first vertically upwardly then obliquely downwardly and forwardly as at 49, then directly rearwardly as at 50 and finally directly downwardly as at 51. Also extending up from the base 46 of the clip 45 are a pair of upper legs or ears 52 which are arranged to bear against the rear extremity of the base flange 14 of the fender 10. It will be observed that the tip or end portion 51 of the tongue 48 extends down between the legs 47. The obliquely downwardly and forwardly bent portion 49 of the tongue 48 provides a cam surface for flexing the tongue rearwardly as the fender shield is moved upwardly (see Figure 8). The rearwardly extending portion 50 of the tongue 48 provides a latch which is snapped over the base edge 14 of the fender 10 into the position as shown in Figure 7.

To mount the fender shield 11 on the fender 10 the latching lever 39 is rocked to a position where the short leg portion 40 thereof is below the top edge of the fender shield. The leading edge 20 of the fender shield is then inserted into the pocket formed by the lip 17 and the rear edge 18 of the scuff pad 16, the shield being held in the position as shown by the dotted line in Figure 1. The shield is then rocked upwardly in substantially the plane of the fender opening until the tongue 48 of the clip 45 is snapped into place over the base edge 14 of the fender 10. It will be observed that when the clip is in this position (as shown in Figure 7) the rear end of the fender shield is vertically supported by the portion 50 of the clip 45 while lateral displacement of the fender shield at this point is restrained by the ears 52. The latching lever 39 is now rocked to the position as shown in Figure 2, or in other words, until the short leg 40 thereof is forced in behind the bent edge 15 of the fender 10. The U-shaped portion 44 at the lower end of the lever 39 is then disposed over the base edge 14 of the fender 10 and the base flange 25 of the fender shield 11. The fender shield 11 is now securely mounted on the fender 10.

To remove the fender shield 11 the lower end 43 of the latching lever 33 is grasped by the hand of the operator and forced rearwardly until the U-shaped portion 44 has become disengaged from the base edge 14 of the fender 10 and the base flange 25 of the fender shield 11. The latching lever 39 is then swung downwardly until the short leg 40 has become disengaged from the bent edge 15 of the fender 10. The tip or end 51 of the tongue 49 is then depressed rearwardly by the hand of the operator until the horizontal portion 50 of the clip 45 has been sprung free of the base edge 14. The shield 11 then drops down at its rear end and may now be readily and quickly lifted out of the pocket in the scuff pad 16.

While we have shown a particular embodiment of our invention, it will, of course, be understood that we do not wish to be limited thereto, since many modifications may be made, and we, therefore, contemplate by the appended claims to cover all such modifications as fall within the true spirit and scope of our invention.

We claim as our invention:

1. A fender having a protective member overlying a portion of the face thereof, and intimately secured thereon, said member having a pair of spaced lips with opposing faces, one of said lips being seated directly on the face of said fender, said lips providing a channel with a longitudinal curved bottom, a portion of said channel being vertically positioned below another portion of said channel.

2. A fender having a protective member overlying a portion of the face thereof, and intimately secured thereon, said member having a pair of spaced lips with opposing faces, said lips forming a concave arcuately extending channel the lower portion of which faces obliquely upwardly.

3. A fender having a protective member overlying a portion of the face thereof and intimately secured thereon, said member having a lip portion spaced from said fender and forming a concave arcuately extending channel, the lower portion of which faces obliquely upwardly therewith, said protective member being formed of a yieldable material and having a reinforcing plate embedded therein, said reinforcing plate extending out into said spaced lip portion.

4. A fender having a scuff pad seated and secured thereon, said scuff pad having a concave rear edge spaced from said fender and forming a concave arcuately extending channel therewith, a lower portion of said channel being adapted to vertically support an object disposed between said rear edge and said fender.

5. The combination comprising a fender having a scuff pad mounted on the forward end thereof and a fender shield detachably secured to said fender, said scuff pad having a portion thereof spaced from said fender and behind which the forward end of said shield is snugly seated, and attaching means in proximity to the rear end of said fender shield for detachably securing the same to said fender.

6. The combination comprising a fender having a scuff pad mounted on the forward end thereof and a fender shield detachably secured to said fender, said scuff pad having a lip projecting from the rear end thereof and providing a face extending substantially parallel to the face of said fender lying opposite thereto, the forward end of said fender shield being seated between said lip and said fender and being vertically supported and laterally restrained thereby, and an additional means on said fender shield for securing the rear end and the top of said fender shield to said fender.

ARTHUR P. FERGUESON.
GEORGE W. SCHATZMAN.